United States Patent
Innes et al.

(10) Patent No.: US 6,754,321 B1
(45) Date of Patent: Jun. 22, 2004

(54) NAMING CONVENTION FOR DIFFERENT TYPES OF DEVICE, AND APPARATUS AND METHODS USING THE NAMING CONVENTION

(75) Inventors: Brian Innes, Dorset (GB); Steven P Wright, Upham (GB)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/611,127

(22) Filed: Jul. 6, 2000

(30) Foreign Application Priority Data

Feb. 22, 2000 (GB) .............................................. 0004010

(51) Int. Cl.[7] ................................................ H04M 3/42

(52) U.S. Cl. .............................. 379/201.03; 379/88.13; 379/100.15; 707/103 R; 709/223

(58) Field of Search ........................ 379/88.13, 100.15, 379/201.03; 704/275; 709/245, 229, 223, 230, 231, 232; 707/103 R

(56) References Cited

U.S. PATENT DOCUMENTS

| | | | |
|---|---|---|---|
| 5,588,119 A | * 12/1996 | Vincent et al. | ............. 709/223 |
| 5,822,404 A | * 10/1998 | Cave | ........................ 379/88.13 |
| 6,047,332 A | * 4/2000 | Viswanathan et al. | ...... 709/245 |
| 6,122,639 A | * 9/2000 | Babu et al. | ............. 707/103 R |
| 6,163,806 A | * 12/2000 | Viswanathan et al. | ...... 709/229 |
| 6,172,980 B1 | 1/2001 | Flanders et al. | |
| 6,226,788 B1 | * 5/2001 | Schoening et al. | ......... 717/107 |
| 6,360,255 B1 | * 3/2002 | McCormack et al. | ....... 709/221 |
| 6,496,927 B1 | * 12/2002 | McGrane et al. | .............. 713/1 |
| 6,667,992 B1 | * 12/2003 | Yanagawa | .................... 370/490 |
| 6,674,767 B1 | * 1/2004 | Kadyk et al. | ............... 370/466 |

FOREIGN PATENT DOCUMENTS

| | | | |
|---|---|---|---|
| EP | 0537894 | 4/1993 | ............. G06F/9/00 |
| GB | 2314243 | 12/1997 | ........... H04L/12/24 |
| WO | 9627064 | 6/1995 | ........... H04L/29/06 |

OTHER PUBLICATIONS

"Name Resolving and Routnig in Mobile Networks", by R. Giaffreda, T.G. Hodgkinson, 3G Mobile Communication Technologies, Mar. 26–28, 2001, Conference Pub No. 477 IEE 2001.
"A Naming System for Feature–based Service Specification in Distributed Operating Systems", Sigsmall PC, association for Computing Machinery, NY, US, vol. 17, No. 3/4, 1991, pp. 12–21, XP000329142.
"An Overview of UNP", Larry L. Peterson, et al, Computer Communication Review, Association for Computing Machinery, NY, US, vol. 19, No. 2, Apr. 1, 1989.
CCITT X.500 Directories—principles and applications, Ray Hunt, Computer Communications, Elsevier Science Publishers BV, Amsterdam, NL. vol. 15, No. 10, Dec. 1, 1992, pp. 636–645, XP000321683.

* cited by examiner

*Primary Examiner*—Bing Bui
(74) *Attorney, Agent, or Firm*—Jerry W. Herndon

(57) ABSTRACT

Provided are methods, apparatus, and computer programs for self-generating device names for communications devices using processes running on the device. The device names are then used to enable the devices to be identified during network communications. This avoids the configuration overhead inherent in requiring unique device names to be allocated by a central naming authority. Uniqueness of device names is achieved by a class-based naming convention in which class names are associated with device types and unique device identifiers are allocated for devices within a class. The device identifiers of one class may have a very different format from device identifiers in other classes, and processes are provided for interpreting the different formats of device identifier to identify individual devices.

16 Claims, 3 Drawing Sheets

NAMING CONVENTION FOR DIFFERENT TYPES OF DEVICE, AND APPARATUS AND METHODS USING THE NAMING CONVENTION

FIELD OF INVENTION

The present invention relates to a naming convention and to methods, apparatus and computer programs for using the naming convention for identification of individual devices of different types.

BACKGROUND

It is predicted that over the next few years the number and variety of communication and data processing devices in existence are going to increase very rapidly. These include devices such as mobile telephones with additional processing capabilities ("smart phones"), personal digital assistants (PDAs), smart home and office appliances, and many application-specific devices such as embedded device-failure management systems, etc.

There is a need for messaging systems which handle communications with these devices to be able to uniquely identify and route messages to and from such devices. However, if all devices are required to conform to a conventional naming convention then the configuration and maintenance requirements of ensuring uniqueness of device identifiers to prevent naming conflicts will be very onerous.

Another issue is that a naming convention in which all device identifiers are tied to a specific communications protocol considerably limits flexibility. It is desirable to enable mobile devices to connect to the communications network using different communications protocols which may each use a different addressing scheme (for example TCP/IP dial up networking, Infra Red beaming, Nokia's Blue Tooth, and WAP each use different addressing schemes).

SUMMARY OF INVENTION

In a first aspect, the present invention provides methods, apparatus and computer programs for generating device names for devices within a communications network wherein the device names comprise: a class name which identifies a device class; and a device identifier which uniquely identifies a device within the class.

The class-based naming convention allows different types of device to have different formats of device identifier. Particular class names are associated with particular types of device which have particular device identifier formats, and the class names each facilitate interpretation and resolution of their associated format of device identifier. In a preferred embodiment of the invention, the class names are used during routing of communications to identify a respective name resolution process for interpreting and resolving the particular format of device identifiers of that class. The name resolution process then identifies a specific device.

The device names are preferably generated by a software component running on the respective devices, from a pre-recorded device class name and a pre-recorded device identifier. This self-generation of device names using pre-recorded data and a process running on the device can ensure global uniqueness of generated device names if device manufacturers each pre-register class names and allocate device identifiers uniquely for each of their devices. That is, if a particular class name can only be used by one organisation or association who manage unique allocation of device identifiers within that class, then global uniqueness of device names is achievable.

The invention avoids the significant configuration and maintenance overhead that would be required if forcing all devices to implement a conventional inflexible naming convention, with each device requiring allocation of a centrally-approved device identifier as the way to avoid name conflicts.

Furthermore, the non-volatile memory which is available on some hand-held devices is limited to read-only memory, and so a device name which is allocated to the device by a central name service or which is otherwise dynamically allocated via apparatus to which the device connects would not be retained in device memory when power is lost or certain failures occur. This potential loss is not a problem when self-generation of device names is implemented according to the preferred embodiment of the present invention, since the device name can be regenerated easily and consistently.

In a second aspect, the invention provides methods, apparatus and computer programs for registering the generated device names with an addressable communications apparatus within a communications network, to enable delivery of communications to registered devices via the addressable communications apparatus. The addressable communications apparatus may be an enterprise server providing a "postbox" service, which mobile devices can connect to when ready to retrieve mail. Alternatively, the communications apparatus may be a router which dials mobile devices upon receipt of communications targeted at the respective device.

In a third aspect, the invention provides methods, apparatus and computer programs for routing communications to devices within a communications network. Devices in the network are identifiable by a device name, and different types of device within the network have different formats of device identifier within their respective device names. The method includes the following steps for resolving a device name to identify an individual device: identifying a class name within a device name and resolving the class name to identify a device class, thereby to identify a process for interpreting device identifiers which have a particular format associated with the device class; identifying a device identifier within the device name, which device identifier corresponds to the device identifier format of the identified device class, and interpreting the device identifier using the identified interpreter process to identify an individual device within the class.

The name resolution steps according to this aspect of the invention are preferably performed at an enterprise server comprising an addressable communications apparatus within the network. Lightweight, mobile communications devices which register with the enterprise server receive network communications via the enterprise server.

Methods according to the invention may be implemented by software. In particular, aspects of the invention may be implemented in one or more program products comprising program code recorded on a machine-readable recording medium, wherein the program code controls the operation of an apparatus on which it runs to perform the steps of the method.

BRIEF DESCRIPTION OF DRAWINGS

Preferred embodiments of the present invention will now be described in detail, by way of example, with reference to the accompanying drawings in which.

DETAILED DESCRIPTION OF PREFERRED EMBODIMENTS

The present invention is implementable in a great many different types of communications and data processing devices such as, for example, personal digital assistants (PDAs), so-called "smart" telephones, laptop computers, remote pipeline control sensors, and communications and data processing devices embedded in apparatus such as vehicles, washing machines, and refrigerators. The invention is implementable to enable network communications between this wide range of devices and more conventional networked computers. The invention is not limited to any specific operating system or any particular communication mechanism, although the invention is compatible with Internet communications.

The invention solves a set of problems that will soon arise because of the enormous proliferation of communications and data processing devices which is currently taking place and which is predicted to continue over the next several years.

If all of the enormous number and variety of different types of device are to be connected to the Internet and are to be capable of initiating and receiving communications, then each device requires a unique name or some other mechanism is required to avoid potential name conflicts. If each device is required to conform to a single, universal device name format then this will require every device to be allocated a unique name which conforms to this format when it is manufactured or when it connects to the Internet. The configuration and maintenance overhead inherent in this will become horrendous, and there could be a considerable delay before a device can be allocated a name which is confirmed to be globally unique.

Currently, many different device manufacturers and many different communication protocols implement their own device naming scheme, such that there is no universal convention.

Figure 1:
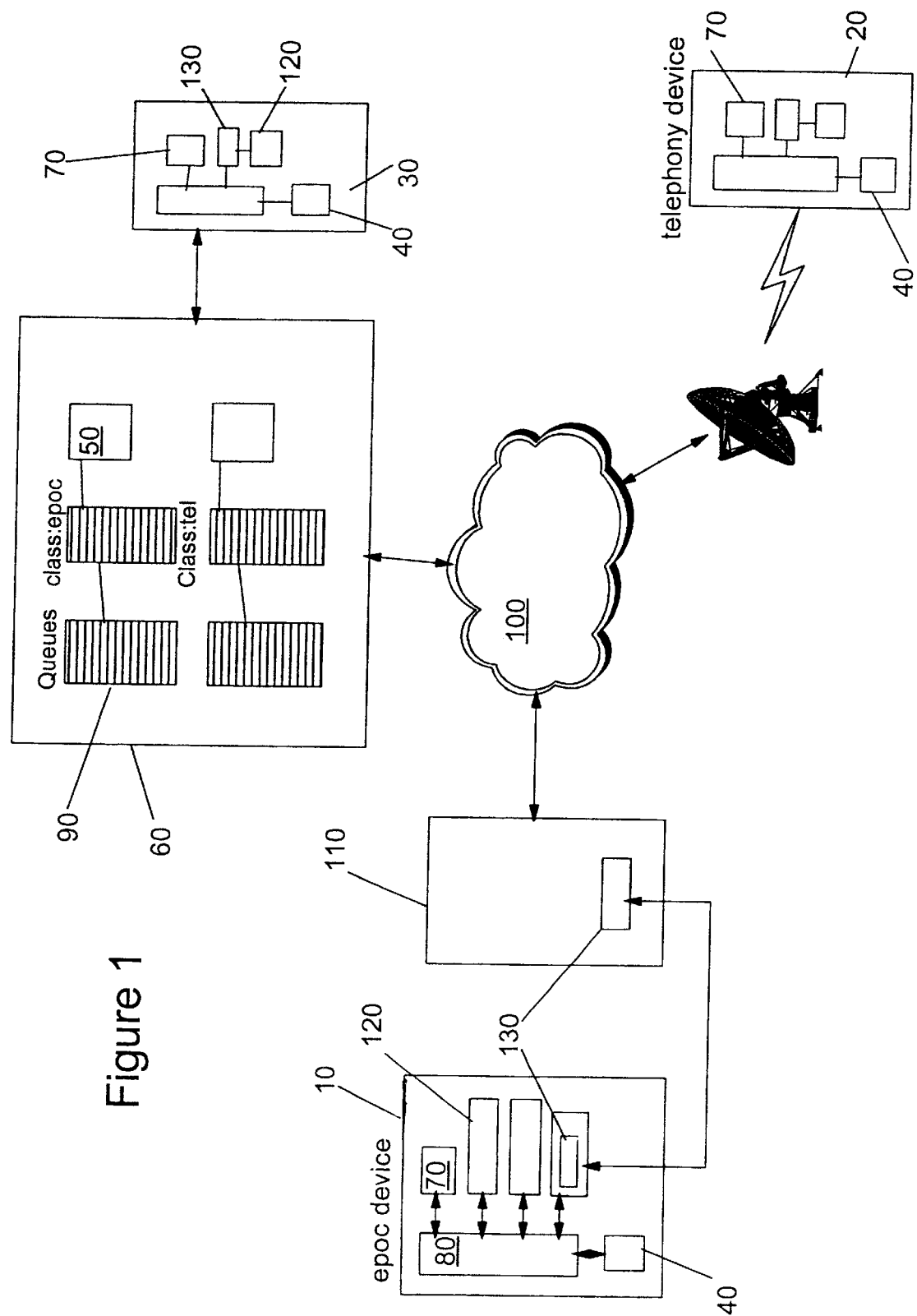
FIG. 1 is a schematic representation of a communications network in which the present invention may be implemented.
Figure 2:
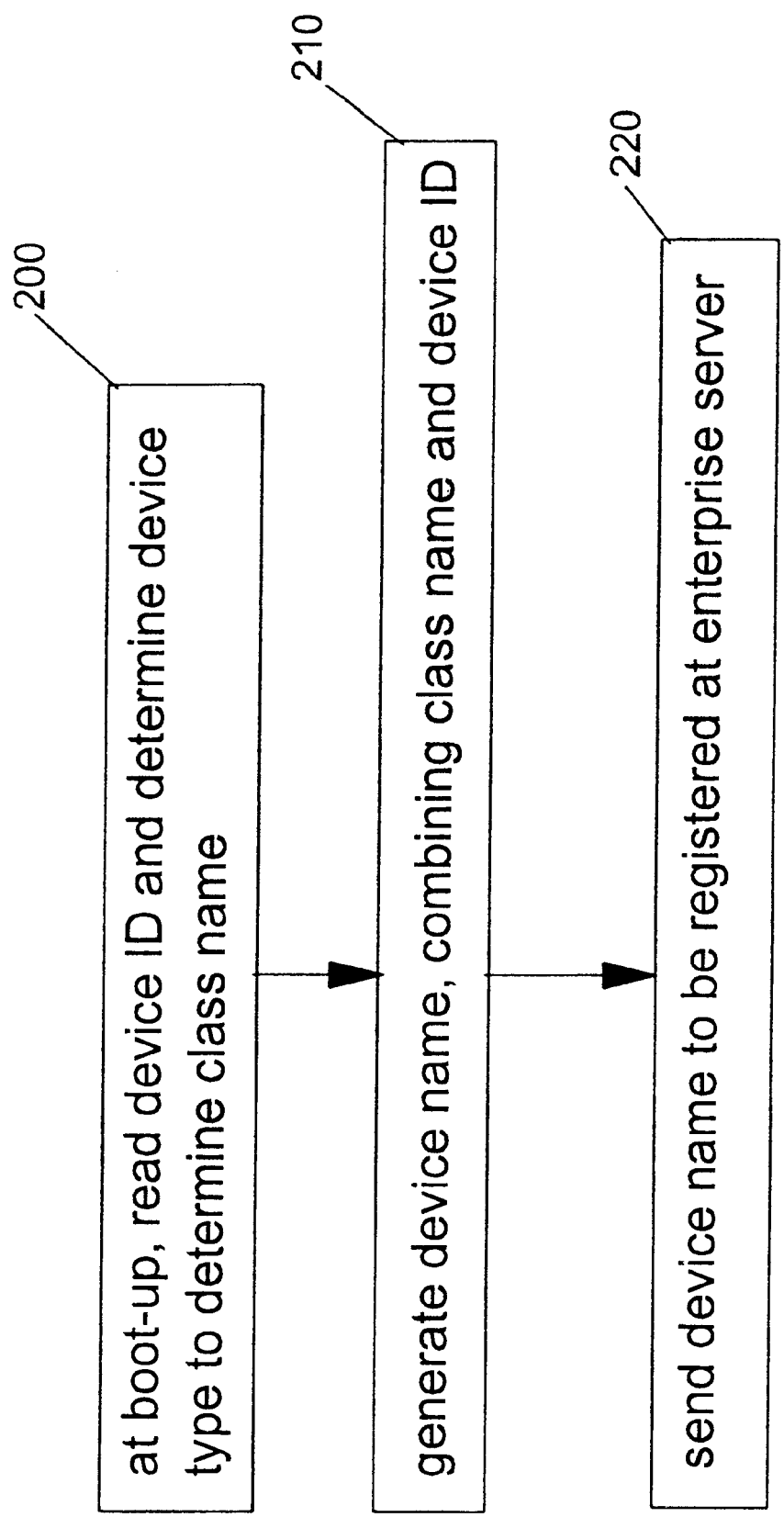
FIG. 2 shows steps of a method of generating a device name according to an embodiment of the invention.
Figure 3:
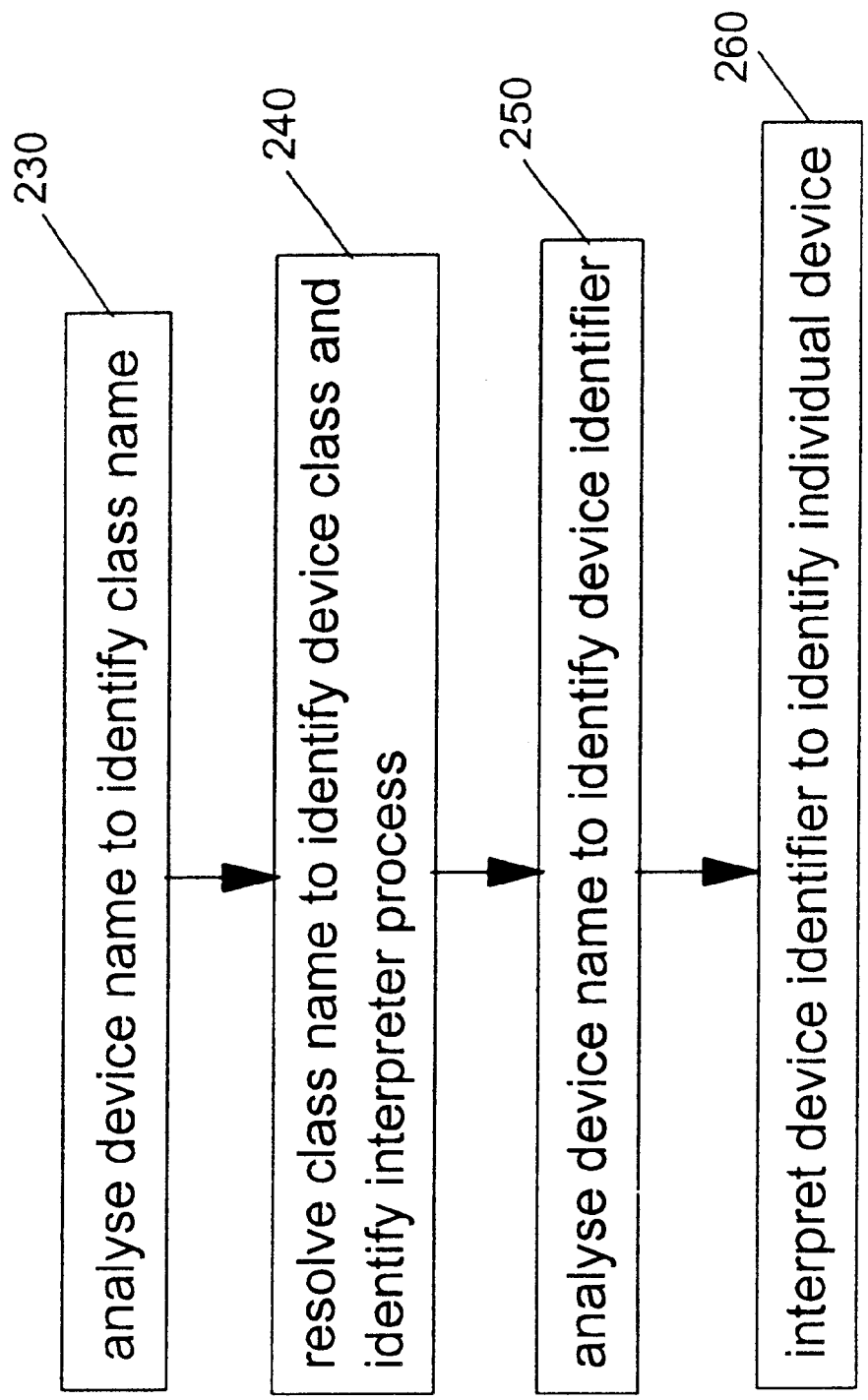
FIG. 3 shows steps of a method of resolving a device name to identify a device according to an embodiment of the invention.

The present invention mitigates these problems, as described below with reference to FIGS. 1, 2 and 3.

According to the invention, device names are generated 210 automatically in a self-determined manner by a software component 70 installed on certain types of communication device 10, 20, 30. This software component constructs 210 a device name, in accordance with a generic hierarchical naming convention, from a class name and a device identifier both of which may be pre-recorded on the device. These two data components are preferably held in a non-volatile hardware component 40 of the device (for example an EPROM, or a SIM card of a telephone, or burnt into a silicon component) and read 200 for use in generation of the device name. Alternatively, the class name may be derived 200 from the operating environment of the device and only the device identifier is pre-recorded. The device class determines the format of the device identifier component of the device name, and hence recognition of a class name allows the format of device identifier for that class to be interpreted.

The self-generation of names according to a class-based, flexible naming convention avoids many of the constraints of conventional rigid naming conventions.

Firstly, it enables communications to support many different naming schemes within the generic hierarchical name structure (class name followed by device identifier which is unique for the class). In particular, the unique identifiers within device names can be formatted differently for each class. This allows the naming convention to make use of existing manufacturer-allocated device identifiers within the naming convention. In contrast, conventional hierarchical naming conventions such as URLs are fixed format and require everyone to conform to the rigid convention and, since every device uses the same form of device name, each device requires a name which has been uniquely assigned to it by some central name allocation authority if naming conflicts are to be avoided.

Secondly, an hierarchical name structure with the flexibility provided by inclusion of a class name component enables additional device identification formats to be easily incorporated in the future by adding classes.

Thirdly, consistently repeatable self-generation of device names avoids the problem of loss of data when a device having no non-volatile writeable memory is powered down—the device name can simply be regenerated each time the device is powered up.

In one embodiment of the invention, the device name is never stored in the device's memory since generation of the device name is a step of the process of sending a message. In some devices, it may be at least as efficient to read a unique device identifier from EPROM, for example, and generate the name each time it is required as it would be to generate the name when the device is powered up and then to store the name in volatile memory for retrieval when required.

Ensuring that each device identifier is unique for its class and confirming that class names are allocated uniquely for different types of device is sufficient to ensure universal uniqueness of device names, avoiding potential name conflicts which could otherwise arise when a common messaging system attempts to handle multiple naming schemes. The unique allocation of class names can be achieved by device manufacturers each pre-registering the class name that they intend to use as part of their device names.

According to a preferred embodiment of the invention, a device's type (class) and a manufacturer-assigned identifier (which is unique within the device's class) are used to generate 210 the device name. For example, if a device type is a 'netBook' device from Psion and the manufacturer-assigned ID for a specific individual netBook is a serial number '1234567812345678', then an example universally-unique device name which identifies the device as being within the class of devices running the EPOC operating system 80 is:

epoc!netBook%1234567812345678@uk.ibm.com where 'uk.ibm.com' is an owning enterprise server name (only required for communications sent from or destined for devices outside of the sender's enterprise network, and even then not required for all types of communication), '!' is a separator between the device name class and the class-specific unique device identifier and '@' is a separator between the unique identifier and the optional enterprise server name. These separators may be any defined symbol. The EPOC operating system 80 provides APIs to access a device type and a unique device ID stored in EPROM, for example, of the device and this facility is used by the name generation software.

The 'epoc' class name is useful during routing of network communications since it determines that a message for this device should be sent to a specific name resolution process which is associated with devices running the EPOC operating system 80. This name resolution process 50 preferably runs on a data processing apparatus 60 at the network address identified by the enterprise server name. This name resolution process is adapted to resolve the unique device identifier 'netBook%1234567812345678' to identify a specific EPOC device known to the 'epoc' name resolution process. Secondly, the class name component of device names are useful for avoiding the potential name conflict that would arise if two devices of different types had identical device identifiers.

More generally, a device name comprises a name class, a unique device identifier within the class, and an optional enterprise name. This takes the form:

<class>!<unique device ID>[@<enterprise>]

Additional examples include a device with built in telephony, which has a device name of:

tel!+44 1234 12345678

An example device name for a device with a burned in IPV6 address is:

ip6!FEDC:BA98:7654:3210:FEDC:BA98:7654:3210

For many devices, the device is able to determine its own ID using the data stored on the device, such as using the EPOC system functions described above. If no such information access features exists for certain devices, for example because interfaces for accessing the unique device identifiers are not yet available, then a unique device name can be assigned to such devices in accordance with the naming convention of the invention. For example, a CPU may have a unique identifier that can be used to enable a network configuration manager to generate a device name for a computer if the computer's operating system does not provide an interface for querying the CPU identifier to enable self-generation of the device name. If device type class names are predefined and the configuration manager selects the appropriate class name for each device, globally unique device names are still achievable.

Thus, the naming convention according to the invention can be implemented for identifying individual devices of all types, even if self-generation of a unique name is not possible for certain device types.

Since the class name identifies a process which is capable of interpreting the specific format of unique identifiers within the class, resolution 240 of the first part of the name (the class name) facilitates comprehension and resolution 260 of the second part (the unique identifier within the class). This is not true of known hierarchical naming conventions. In such known conventions, a device identifier may comprise a plurality of separate components which are resolved in separate steps, but resolution of one component does not determine the format of subsequent components from a set of potential formats and hence does not facilitate comprehension and resolution of subsequent components.

For example, resolution of the components of an internet address (which implements an hierarchical structure such as: "server name.country name.company name.organisation type") merely involves a series of lookup operations to step through an hierarchical directory. The naming convention of the present invention is compatible with internet addressing, but extends it in a flexible manner which helps to avoid name conflicts and permits self-generation of names.

In the preferred embodiment, generated device names are registered 220 with an enterprise server 60 within the network 100. This can involve a systems administrator of an organisation which owns the device notifying the organisation's enterprise server of the device names of all devices owned or approved by the enterprise. A communications manager process at the server thereafter routes to a respective server-based input queue all communications which are destined for that device.

Alternatively, the step of sending 220 a request to the enterprise server to register a device name can be implemented as one of the functions performed by the name generation software component 70 running on a device. In this latter case, the sending of a registration request or notification could be performed whenever the name is generated. If the name is regenerated during a single user session, the registration requests may be limited to one per user session to avoid unnecessary transmissions.

The enterprise server operates a postbox service for mobile devices owned or managed by the particular enterprise. Communications from remote data processing systems or communications devices which are targeted for a particular pervasive device are sent to the relevant enterprise server and are added to a respective queue 90 in the storage of the enterprise server 60. For mobile devices which may connect to the network at different locations, and for other devices which connect to the network via wireless connections such that permanent connection-availability cannot be assumed, the communications are held at the enterprise server 60 until requested by the mobile device.

When network communications are required by a mobile device user, the device 10 is connected to a network-connected computer 110. This may be anywhere in the network. The networked-computer serves as a gateway or proxy for remotely accessing the enterprise server, and allocates an IP address for the mobile device. From the viewpoint of the enterprise server, the networked-computer appears to be the registered mobile device, and so the mobile device 10 can request its incoming communications to be forwarded to its newly assigned IP address via the proxy. The mobile device then retrieves any communications sent to it via the proxy.

When the mobile device disconnects from the network-connected computer 110, the network-connected computer ceases to act as a requesting proxy and so no further communications intended for the mobile device are sent to the network-connected computer. Instead, communications will be queued at the enterprise server 60 until the mobile device 10 once again connects to the network 100.

For certain types of device, the above approach of storing communications to await the mobile device to initiate connection may be inappropriate. For example, in the case of a mobile device with telephony capabilities and a device name which includes a telephone number as the device identifier, the name resolution service on the enterprise server may be used to identify that the device is a telephony device (from the device class name) and to extract the telephone number (device identifier) and then the device is dialled using the telephone number.

A sender device which is sending communications to another device using a naming convention according to the invention specifies the following information to identify the target device:

1. a name determining a corresponding network address of a communications apparatus (enterprise server) with which the device name is registered;
2. a device name class; and
3. a device identifier which is unique for the class and which corresponds to the device identifier format of the class.

The enterprise server name is a conventional Internet Protocol address component, using the existing Internet infrastructure to identify an enterprise server with which particular device names are registered. Using this information and a Distributed Name Service, a communication destined for a communications device is delivered to the desired enterprise server 60. At the enterprise server, the device class name is identified 230 within the device name and interpreted 240 to identify a process 50 for interpreting device identifiers of the format of the identified class. The device identifier is identified 250 and then the identified interpreter process 50 interprets 260 the device identifier to identify a specific device.

In an asynchronous messaging and queueing environment, interprocess communications are delivered across a heterogeneous network by a sender application program or process 120 placing messages on an outgoing queue, by communications manager programs 130 on computers within the network handling the delivery of messages across the network to a target queue, and by a target receiver process retrieving messages from the target queue when ready. Examples of such communications manager programs implementing message queueing are IBM Corporation's MQSeries (TM) family of messaging middleware products. In particular, IBM's MQSeries product family includes a computer program product which is specifically designed to satisfy the messaging needs of lightweight devices, as well as supporting mobility and the special requirements that arise from use of wireless communication networks.

In an embodiment of the present invention in a message queueing network, sending messages to a target process on a mobile device requires specifying: the enterprise server address; a device name comprising a class name and unique device identifier (corresponding to a specific queue manager name if there is one queue manager, as is envisaged for typical resource-constrained mobile devices); and additionally a queue name relevant to the target process.

According to this embodiment, the message queuing services of the communications manager programs are used to deliver interprocess communications to an input queue corresponding to a particular target process on the identified device. This target process must then access the queue to retrieve incoming messages. The use of such communications manager programs for inter-process communications enables processes running on lightweight, mobile devices to be part of a global messaging network.

All application programs running on a mobile device must access their respective input queue, which is managed by the communications manager program on the device, in order to retrieve incoming communications. Similarly, the application programs send messages to queues managed by their local communications manager program when initiating inter-process communication both within the device and across the network. The messages are placed either on a local queue for retrieval by another application program running on the same device or on a transmission queue for delivery to an input queue of an application program running on a different device.

The above description of preferred embodiments of the invention referred to the achievement of globally unique device names. In an alternative embodiment, aspects of the invention may be implemented to achieve device names which are unique within an enterprise but which are not required to be globally unique. This relies on the enterprise server name as a name component which distinguishes between enterprises, and then the allocation of class names only needs to be managed within the enterprise instead of globally. There are significant weaknesses with this approach, such as that devices would have to be renamed when moving to a new enterprise network unless device names are globally unique.

The above description of a preferred embodiment suggests that a single enterprise server computer provides both the post box service and a name resolution process. In alternative embodiments, these services may be provided by different computers.

What is claimed is:

1. A method for routing communications to devices within a communications network, the method including the following steps for resolving a device name to identify a device within the network:

identifying a class name within a device name and resolving the class name to identify a device class, thereby to identify a process for interpreting device identifiers which have a particular format associated with the device class;

identifying a device identifier within the device name, which device identifier corresponds to the device identifier format of the identified device class, and interpreting the device identifier using the identified interpreter process to identify an individual device within the class.

2. A method according to claim 1, wherein the step of interpreting a device identifier includes initiating a communication process using the device identifier to send a communication to the identified individual device.

3. A method according to claim 2, wherein the device name resolution steps are performed at a network-connected data processing system in response to receipt by the network-connected data processing system of a communication addressed to a target device, and wherein the initiated communications process sends the communication from the network-connected data processing system to the identified device.

4. A method according to claim 2, wherein the step of initiating a communication process comprises transferring the communication to a queue at the network-connected data processing apparatus which queue is serviced by the identified device.

5. A method according to claim 1, wherein the device name resolution steps are performed by a name resolution service running on a network-connected data processing system, the name resolution service being initiated in response to requests from any of a plurality of network-connected data processing systems.

6. A program product, comprising program code recorded on a machine-readable recording medium, the program code controlling the operation of a data processing apparatus on which it is run to perform a method according to claim 1.

7. An apparatus for routing communications to devices within a communications network, wherein devices within the network are identifiable by a device name, the apparatus including:

means for receiving a communication including a target device name;

program code for analysing the device name to identify a class name within the device name and for resolving the class name to identify a device class, thereby to identify a process for interpreting device identifiers which have a particular format associated with the device class;

program code implementing the identified interpreter process for identifying a device identifier within the device name, which device identifier corresponds to the device identifier format of the identified class, and for interpreting the device identifier using the identified interpreter process to identify an individual target device; and means for forwarding the communication to the target device.

8. A name server apparatus, for resolving a device name to identify a device, the apparatus including:

program code, responsive to input of a device name, for identifying a class name within the device name and for resolving the class name to identify a device class, thereby to identify a process for interpreting device identifiers which have a particular format associated with the device class; and program code implementing the identified interpreter process for identifying a device identifier within the device name, which device identifier corresponds to the device identifier format of the identified device class, and for interpreting the device identifier to identify an individual device within the class.

9. A method of generating a device name for use in communications with other devices within a communications network, comprising:

determining the type of a communications device to determine a respective class name associated with the device type; and reading device identifier information held on the communications device; and generating a device name which combines the class name and device identifier information, the device name generation being performed by program code running on the device.

10. A method according to claim 9, wherein the program code performing device name generation is initiated to generate the device name as part of the device boot up process.

11. A method according to claim 9, wherein the program code performing device name generation is initiated to generate the device name when a hard disk on the device is configured.

12. A method according to claim 9, wherein the program code performing device name generation is initiated to generate the device name in response to a process on the device generating a communication for sending to another device.

13. A method according to claim 9, including the step of sending a communication to a network-connected communications apparatus within the communications network to request registration of the generated device name by said communications apparatus, thereby to enable routing of communications to the device via the communications apparatus.

14. A program product, comprising program code recorded on a machine-readable recording medium, the program code controlling the operation of a data processing apparatus on which it is run to perform a method according to claim 9.

15. A method of enabling a communications device to communicate with other devices within a communications network, comprising the steps of:

registering a class name with a class name allocation controller which controls unique allocation of class names to particular classes of device;

allocating device identifiers uniquely to individual devices within a device class; and installing program code on the communications device for determining the type of a communications device to determine a respective pre-registered class name associated with the device type, program code for reading device identifier information held on the communications device, and program code for generating a device name which combines the class name and device identifier information, such that said generated device name is unique.

16. A communications device including means for generating a device name, for identifying the device when communicating with other devices within a communications network, the means for generating the device name including:

program code for determining the type of a communications device and for accessing device identifier information held on the communications device;

program code for analysing the device type to determine a respective class name associated with the device type, and for generating a device name which combines the class name and device identifier information.

* * * * *